United States Patent [19]
Lamerant

[11] Patent Number: 6,110,377
[45] Date of Patent: Aug. 29, 2000

[54] PROCESS FOR RECOVERING THE SODIUM CONTAINED IN INDUSTRIAL ALKALINE WASTE

[75] Inventor: Jean-Michel Lamerant, Beouc Bel Air, France

[73] Assignee: Aluminum Pechiney, Courbevoie, France

[21] Appl. No.: 08/831,419

[22] Filed: Apr. 1, 1997

[30] Foreign Application Priority Data

Apr. 1, 1996 [FR] France .................................. 96 04288

[51] Int. Cl.$^7$ .................................................. B01D 15/04
[52] U.S. Cl. .......................... 210/670; 210/681; 423/121; 423/181
[58] Field of Search .................... 210/670, 681; 423/181, 112, 121

[56] References Cited

U.S. PATENT DOCUMENTS 4,133,866  1/1979  Lakatos et al. .......................... 423/208
4,172,783  10/1979  Adams et al. .......................... 210/677

FOREIGN PATENT DOCUMENTS 1108319  9/1981  Canada .

0 253 635  1/1988  European Pat. Off. .
WO 94/02417  2/1994  WIPO .

OTHER PUBLICATIONS

Database WPI, Week 8243, Derwent Publications, Ltd., AN 91156, XP002019139 & JP 57 149 805 A (Showa Keikinzoku KK), Sep. 16, 1982.

*Primary Examiner*—Ivars Cintins
*Attorney, Agent, or Firm*—Oblon, Spivak, McClelland, Maier & Neustadt, P.C.

[57] ABSTRACT

The invention concerns a process that uses an ion exchanger resin to recover the sodium contained in industrial alkaline waste and, in particular, in the "red mud" and sodium effluents coming from the manufacture of aluminum hydrate according to the Bayer process. It includes putting the alkaline resins (1), usually "red mud" in the form of an aqueous suspension in contact with an RH$^+$ type cationic resin, preferably, a carboxylic resin to attach the sodium selectively and quantitatively to the resin (5) and then to extract it quantitatively in the form of NaOH (8) by displacement using a lime suspension (6), preferably, lime milk. The resin (9), after attaching the calcium, is then regenerated for reuse at the beginning of the process (2) by elution of the calcium as CaCl$_2$ (12) with a diluted hydrochloric acid solution (10).

23 Claims, 1 Drawing Sheet

PROCESS FOR RECOVERING THE SODIUM CONTAINED IN INDUSTRIAL ALKALINE WASTE

BACKGROUND OF THE INVENTION

1. Field of the Invention

The invention concerns a process that uses an ion exchanger resin to recover the sodium contained in industrial alkaline waste and, in particular, in the "red mud" and sodium effluents coming from the manufacture of aluminum hydroxide according to the Bayer process.

2. Discussion of the Background

The Bayer process that is widely described in specialized scientific literature is the essential method for producing the aluminum to be transformed into metal aluminum by igneous electrolysis or to be used as industrial alumina.

According to this process, bauxite ore is digested by a hot concentrated sodium hydroxide aqueous solution, also called the digestion liquor, to solubilize aluminum hydroxide from the bauxite. The supersaturated sodium aluminate solution that results from this digestion is then separated from the solid phase, which consists of the undigested residue of the ore that is rich in iron oxides and called "red mud." Next, the supersaturated sodium aluminate solution is decomposed, that is, unsaturated by precipitation of the sodium hydroxide in a starting bath before it is recharged with soda and recycled as the digestive liquor of the bauxite ore. As for the red mud, after several washings by decanting to recover the sodium aluminate liquor permeating this mud, it is usually discharged because the possibilities for developing these by-products remain limited.

The red mud consists mainly of iron, titanium and aluminum oxides and hydroxides, compounded in the form of the silico-aluminate complexes that pre-exist in the ore, but it also contains insoluble products, such as compounds of the hydroxysodalite family with a general formula: $Na_2O$, $Al_2O_3$, $2SiO_2$, $\frac{1}{3}(Na_2Ca)X$, $mH_2O$, where X may be the anion of $2Cl^-$, $2OH^-$, $SO_4$—or $CO_3$—that are formed during the sodium digestion by the combining of free soda with silica and alumina; these are also called desilication products. The soda, compounded in this way and representing at least 90% of the total soda fixed in the red mud, of course, cannot be recovered by washing in water. In addition, the quantity of the soda compound that is thus lost by being washed into the mud is all the more high as the bauxite content of silica is high.

As a rough guide, the content by weight of the main components of the dried mud can vary in the following proportions:

| | |
|---|---|
| $Al_2O_3$ | 10 to 20% |
| $SiO_2$ | 5 to 20% |
| $Fe_2O_3$ | 30 to 60% |
| $TiO_2$ | 5 to 10% |
| CaO | 1 to 4% |
| $Na_2O$ | 4 to 12% |

Loss in fire and miscellaneous: the supplement up to 100%.

It is thus frequent during the alkaline digestion of bauxites with a silica content by weight above or equal to 5% to record soda losses into the red mud on the order of 100 kg of $Na_2O$ per ton of alumina produced. This soda, trapped in the form of sodium silico-aluminate may be 10% or even 12% by weight of the $Na_2O$ in the dried red mud.

Many processes have been proposed to reduce the soda losses in red mud. In particular, acid processes that consist of digesting washed red mud and putting it back in suspension in water by using a sulfur compound such as $SO_2$, $H_2SO_4$ or carbonic acid that makes it possible to solubilize the sodium compound while the silica is kept as a solid residue, are known.

Thus FR 2372238 (U.S. Pat. No. 4,119,698) achieves sulfuric digestion of red mud at a high temperature (250 to 300° C.) to dissolve most of the metallic, aluminum, iron, titanium, sodium, and calcium components in the form of sulfates that are separated from the silica by filtration. Then the titanium, iron, and aluminum are eliminated selectively so that only sodium sulfate is kept in solution. Taking into consideration the particularly severe digestion conditions that are consequently difficult to achieve, as well as numerous liquid/solid separation operations, this process has turned out to be very expensive to use and, in addition, it does not result in enhanced value of the sodium recovered in a directly recyclable form in the main Bayer process circuit.

FR 2576149 (U.S. Pat. No. 4,668,485) achieves selective digestion of the combined soda in red mud by barbotting $SO_2$ in an aqueous solution of the mud at less than 100° C. The sodium and part of the aluminum passes into solution in sulfite form. Using lime causticizing, the sulfite anion is precipitated out as calcium sulfite, and the sodium and aluminum are kept in solution as sodium aluminate that is reusable directly in the Bayer circuit. If this process makes it possible to enhance the value of the sodium extract of red mud in a better way, it also remains very difficult to use because of the problems posed by the separation of silica, which in $SO_2$ digestion at low temperature can pass partially into a colloidal state, and by the reprocessing of calcium bisulfate, a by-product of caustification.

Processes for the basic treatment of red mud that consist of direct caustification of the mud by lime are also known. Under certain temperature and lime concentration conditions, the sodium in the desilication products can be replaced by calcium.

That is what U.S. Pat. No. 4,486,393 achieves by putting the mud in suspension in its last washing water, which also contains free soda at a temperature around 100° C. and in contact with a sufficient amount of lime meant, on one hand, to substitute for the sodium compounds of the desilication products and free the soda, but also to extract part of the compounded alumina from these desilication products. This easy-to-use process, however, makes it possible to extract only 30 to 40% of the compounded soda. By performing the same operations at a much higher temperature (about 300° C.), U.S. Pat. No. 4,483,830 recovers more than 90% of the compounded sodium in red mud with, on the other hand, the disadvantage of having to use processing methods that are very expensive not only in terms of investment but also in operating costs, especially, since they involve high pressure-sealed batteries.

OBJECTS OF THE INVENTION

Improving the process for recovering the sodium in industrial alkaline waste and, particularly, in red mud before discharge to provide a compounded sodium extraction yield on the order of 90%, at less cost and in the form of a product that can be directly enhanced in value, is one main objective of the invention.

SUMMARY OF THE INVENTION

The process according to the invention, which is believed to rest, in theory, on the following two established facts, achieves the above object:

a cation resin insoluble by nature, of an RH³⁰ type with average acidity (defined by its pka constant) in direct contact with generally solid alkaline waste, like red mud, attaches the sodium compounds quantitatively, once the sodium is attached to the above mentioned resin it can in its turn be freed quantitatively in the form of a concentrated soda solution in contact with another solid, such as lime.

It is to be noted that applicant is not bound by any particular theory.

More specifically, the invention concerns a process for recovering the soda contained in industrial alkaline waste, in particular, red mud and concentrated soda effluents coming from the manufacture of aluminum hydroxide (for example, using the Bayer process), and it includes the following operating sequence:

① an RH⁺ type cation ion exchanger resin is selected,

② this resin is put in direct contact with the alkaline wastes in an amount sufficient to attach (complex) most, preferably all, of the sodium contained in the above mentioned wastes and forming an homogeneous aqueous suspension at a suitable temperature.

③ after a contact time that is sufficient to provide transfer and attachment of the sodium to the resin, the resin charged with the sodium is separated from the alkaline waste which has had the soda removed and can now be discharged.

④ the sodium-charged resin is put in contact with lime, preferably in the state of lime milk, to form a resin and lime suspension in water, ⑤ after a sufficient contact time at a suitable temperature, the soda concentrated solution with immediate enhanced value is separated from the calcium-charged resin.

⑥ the RH⁺ cation resin is regenerated for reuse at the start of the process by elution of the calcium with a diluted mineral acid to form a neutralized calcium salt that can be easily eliminated.

DESCRIPTION OF PREFERRED EMBODIMENTS

Figure 1:
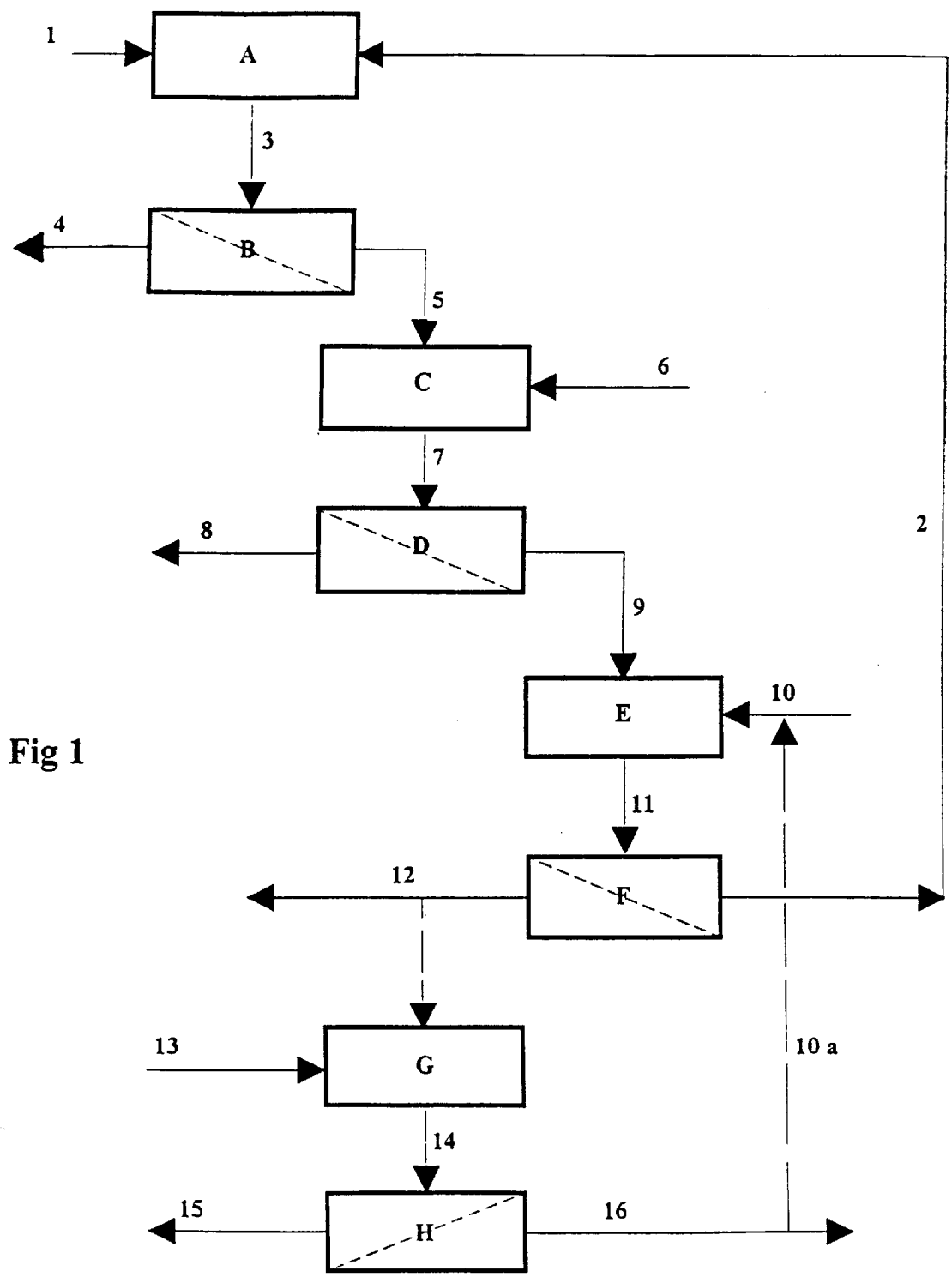
FIG. 1 shows a schematic of a preferred invention process.

Neutralization before discharge of alkaline effluents, even simple demineralization of the water in contact with an ion exchanger in order to extract sodium in solution from it, are well known applications of acid cation resins. The attached sodium is then eluted by a strong acid that regenerates the cation resin and forms a sodium salt solution recoverable by crystallization.

On the other hand, the extraction of industrial alkaline waste, that are usually solid as red mud by a sodium resin, constitutes a quite astonishing result if the fact that at least 90% of the sodium is insoluble in water since it is compounded in the form of a complex sodium silico-aluminate, like hydroxysodalite, is taken into consideration.

The process of the invention causes the resin to react directly with the alkaline waste, occurring as red mud, in suspension in water preferably at a temperature of at least 60° C. and, more preferably, between 75° C. and 95° C., preferably for 30 minutes to 2 hours with agitation. The cationic resin used, marked RH⁺, is characterized by its acidity measured by the value of the pka constant of the acid marked on the insoluble matrix.

This resin can be a strongly acidic R—SO₃H sulfonic resin (pka#0), an R—CH=CR—COOH methacrylic resin with low acidity (pka#6), but preferably a resin with moderate acidity (pka between 2 and 5) such as an R—COOH carboxylic resin (pka#4.5) is used, providing not only quantitative attachment of the sodium that substitutes for the strongly bonded H⁺ cation, but also complete regeneration by elution of the attached cation by a strong mineral acid, usually HCl. Thus, useful pka's are 0–6, including all values, ranges, and subranges therebetween such as 1, 2, 3, 4 and 5 and 1–2, 1–3, 2–4, etc. Useful cationic resins include IMAC® HP 336F (Rohm and Haas), Amberlite® IRC-50 (Rohm and Haas) and Lewatit® CNP 80 (Bayer France), the product brochures and MSD sheets thereof incorporated by reference herein.

Although these resins are by nature insoluble, they turn out to be capable of digesting the solid waste, such as red mud, to extract the sodium from it. After separation by simple filtering of the resin grains from the solid residue from which the sodium has been removed, the sodium attached to the resin is put back into solution as NaOH by putting the above mentioned resin in contact with another solid in suspension, lime Ca(OH)₂, preferably in the form of lime milk. The Ca⁺⁺ is substituted then for 2 Na⁺ cations according to the reaction:

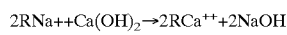

$$2RNa + Ca(OH)_2 \rightarrow 2RCa^{++} + 2NaOH$$

wherein R is resin.

As for the sodium digestion of the red mud, in a quite surprising way, a cationic exchange reaction is produced quantitatively between the solids.

In practice, a stoichiometric quantity of lime with an additional 5 to 10% by weight is caused to react. Thus, a relatively concentrated pure soda solution (25 to 40 g of NaOH/liter) that can be directly reused in the Bayer chain is obtained.

It should be noted that the doubly charged Ca⁺⁺ calcium ions are attached more easily to the resin than monovalent sodium ions so that in forming an homogenous sodium-charged resin and lime milk suspension agitated for 1 to 3 hours at a temperature above 30° C., and, preferably, between 50 and 90° C., the quasi-totality of sodium attached to the resin goes into solution as NaOH.

The calcium-charged resin in the form of R Ca⁺⁺ is then separated by filtering the soda solution to be regenerated by elution of the calcium with a diluted strong acid solution with pH <3. The elution of calcium by HCl, in particular, makes it possible to collect a rather concentrated solution of calcium that is easy to transform into the very insoluble CaSO₄ with H₂SO₄ and makes possible both the recycling of HCl as a permanent elution acid and the discharge of CaSO₄.

A strongly diluted but impure acid coming, for example, from the acid residual effluents of the chemical industry can also be used advantageously as a regeneration acid. The selectivity of the resin in relation to the cations makes it possible in fact to neutralize these effluents before they are discharged without any risk of polluting the resin by drawing in anions; thus, this resin is guaranteed to have good reactivity even after numerous regeneration cycles. Thus, not only is an excellent sodium extraction rate obtained, but its restitution in the form of a very pure soda solution as well.

The very great ease of using this sodium recovery process that requires little investment and a low operating cost will also be noted. In addition to low energy requirements and a very easy separation of the resin from the solids in suspension (insoluble wastes, red mud, lime) using simple filtering without dirtying the polymer material, it is necessary to note that since the substitution reactions of the $H^+$ cations by $Na^+$, then 2 $Na^+$ by $Ca^{++}$, and finally $Ca^{++}$ by 2 $H^+$ are quantitative, it is not necessary to work in a column to obtain excellent sodium extraction yields (on the order of 90% of the compounded sodium). Conducting simple and inexpensive "batch" operations is very applicable. Of course, continuous processes may also be used.

The implementation of the process according to the invention will be better understood by the following detailed description of working examples supported by FIG. 1, which is a preferred schematic representation of the operating process.

EXAMPLES

An Australian WEIPA bauxite containing by dry weight 54.22% $Al_2O_3$, 12.01% $Fe_2O_3$, 2.83% $TiO_2$, 0.16% $Na_2O$, 25.18% lost to the fire and miscellaneous substances, and especially 5.6% $SiO_2$, was pulverized completely to 315 $\mu$, and then, after addition of lime, was digested at 255° C. for 8 minutes by putting it in suspension in a decomposed sodium aluminate liquor coming from the Bayer process and characterized by an RP ratio of the $Al_2O_3$ concentration in g/liter in solution to the $Na_2O$ sodium concentration in g/liter generally between 0.5 and 0.8 and by a sodium concentration generally above 160 g $Na_2O$/liter.

After cooling, the supersaturated sodium aluminate liquor, intended for decomposition, is separated by decanting and then by filtration from the undigested solid waste or red mud that is washed in water by putting it back in suspension and decanting it until the sodium content of the washing waters is less than 1 g $Na_2O$/liter. From the industrial mud, the average dry composition of which is then:

---
$Al_2O_3$, 17.12% $SiO_2$ 16.71% $Na_2O$, 9.87%, 9/10
of which is compounded
$Fe_2O_3$, 34.53% $TiO_2$, 8.78% CaO, 2.38%
Loss to fire and miscellaneous, 10.61%
--- a batch of 14 kg of permeated mud 1 is removed; this batch corresponds to 7.4 kg dry solid that is mixed (A) in an agitated reactor at 85° C. for 1 hour with 12.1 kg of an IMAC HP 336® $RH^+$ type carboxylic resin 2, with the knowledge that 1 kg of the above mentioned resin can in the best conditions attach 60 to 70 gr of the sodium expressed as $Na_2O$.

At the end of this treatment, the mixture 3 is filtered (B) at 0.50 mm to separate the resin 5, charged with the sodium from the mud, from which the soda was removed 4, and which can now be discharged. The analysis of the mud treated in this way is the following:

---
$Al_2O_3$, 17.59% $SiO_2$ 17.7% $Na_2O$, 1.01%,
$Fe_2O_3$, 35.72% $TiO_2$, 8.98% CaO, 2.44%
Loss to fire and miscellaneous, 16.56%
---

It should be noted, therefore, that due to this treatment 90.1% of the $Na_2O$ was extracted from the mud after digestion.

The sodium-charged resin 5 is then mixed (C) with the lime milk 6 (with all the grains in suspension at a size less than 100 micrometers) at 60° C. to be agitated into an homogeneous suspension with a sodium concentration in the liquor that increases regularly and stabilizes at the end of 2 hours at 36 g NaOH/liter, corresponding to the replacement in the resin of all the attached sodium by the calcium ion. The process continues by filtering (D) the suspension 7 until the calcium-charged resin 9 is separated from the concentrated sodium liquor 8 (about 28 g/liter $Na_2O$) that can be directly recycled in the Bayer chain.

Finally, the calcium-charged resin 9 is cold mixed (E) with an impure hydrochloric acid solution 10 containing metallic salts, such as iron ($Fe^{++}$ and $Fe^{+++}$), aluminum, zinc, and chromium salts. A progressive enrichment of the calcium content of the impure hydrochloric acid solution, the pH of which stabilizes at the end of an hour in the vicinity of 3, is noted.

The resin, regenerated as $RH^+$ 2, is separated out by filtering (F) and after a safety washing in demineralized water is recycled to the beginning of the process. It can be noted that all the metallic salts present in the elution acid solution 10 are integrated into the eluted solution with a calcium chloride base 12 without any reduction in the regeneration capacity of the resin that doesn't attach any anion from the impurities, thereby confirming its excellent cationic selectivity. This characteristic is particularly evident in the treatment of the concentrated soda effluents coming from the manufacture of aluminum hydroxide by the Bayer process that is the subject of another example of the usage of the invention process and will be described further on.

Finally, it should be noted that in a variant of the use of the invention process it is possible to avoid the discharge of the neutralized eluted solution with the calcium chloride base 12 as an effluent by precipitation (G) in contact with a diluted impure sulfuric acid solution 13 (for example, the cleaning sulfuric acid) and at a temperature of about 60° C., of calcium sulfate in the form of a suspension 14; after filtering H this makes it possible to isolate the inert, insoluble calcium sulfate residue that can be discharged 15 and an acid filtrate 16 containing impure hydrochloric acid (reaction product) that can be reused partially or totally 10a for regeneration of the resin in the $RH^+$ form.

In this case of soda effluents coming from the manufacture of aluminum hydroxide using the Bayer process, the industrial alkaline waste is no longer a solid like red mud but a sodium effluent containing about 30 g $Na_2O$/liter loaded with impurities such as sodium humates, carbonate, sulfate, and oxalate, and coming, for example, from the washing waters of the aluminum trihydroxide precipitated in the Bayer circuit, or from the red mud. In this case, it is enough to replace in the preceding example the sample 1 of 14 kg of permeated mud that represents 7.4 kg of dry solid containing about 10% by weight $Na_2O$/liter, and then to follow the same a; operating method. It should be noted in step A when it is put Cal in contact with the carboxylic resin 2 that 30 minutes is enough for the resin to attach all the sodium contained in the liquor, mainly in the form of NaOH, while the different anions of impurities like sodium humates, sulfate, carbonate, oxalate are not attached. They are discharged then in the form of a liquor with the sodium removed and no longer as mud with the sodium removed 4. In this way, thus, Bayer circuits can be purged from their impurities, especially sodium humates, carbonates, and oxalate without a loss of caustic soda.

While one of the main objectives of the process in accordance with the invention is to recover at least >10%, preferably 20–90% and more of the sodium in industrial alkaline waste at the least cost and in a very value-enhanced form as a concentrated pure sodium solution, the process also offers other interesting possibilities; for example, it authorizes the use of residual acids as auxiliary materials for the regeneration of the resin, while ensuring they are neutralized and in so doing, avoiding a specific neutralization operation before discharge.

This application is based on French patent application 96 04288 filed Apr. 1, 1996, incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Process for removing insoluble sodium contained in alkaline waste, comprising the steps of:
   placing an $RH^+$ type cation exchange resin in direct contact with the alkaline waste in an amount sufficient to complex some or all of the insoluble sodium contained in the waste and forming an homogeneous aqueous suspension;
   allowing a contact time that is sufficient to provide transfer and attachment of insoluble sodium in the waste to the resin,
   separating the resin charged with the sodium from the alkaline waste;
   contacting the sodium-charged resin with lime and water to form a resin and lime suspension in water;
   allowing a sufficient contact time between the resin and lime suspension to provide a calcium-charged resin;
   separating a concentrated soda solution from the calcium-charged resin;
   recycling the separated concentrated soda solution to a digestion liquor used in a Bayer process; and
   optionally regenerating the $RH^+$ cation resin with a diluted mineral acid which can form a neutralized calcium salt.

2. Process according to claim 1, wherein the $RH^+$ cation resin is a carboxylic resin.

3. Process according to claim 1, wherein the temperature at which the resin is put in contact with the alkaline waste is at least 600° C.

4. The process of claim 3, wherein said temperature is from 75–95° C.

5. Process according to claim 1, wherein the amount of time the resin is in contact with the alkaline waste is from 30 minutes to 2 hours.

6. Process according to claim 1, wherein the resin is separated from the suspension containing the alkaline waste by filtering.

7. Process according to claim 1, wherein the quantity of lime put into contact with the resin to substitute for the complexed sodium is a stoichiometric quantity plus a 5–10% excess.

8. Process according to claim 1, wherein the temperature at which the sodium-charged resin is put in contact with the lime is above 30° C.

9. The process of claim 7, wherein said temperature is from 50–90° C.

10. Process according to claim 1, wherein the amount of time the sodium-charged resin is in contact with the lime is id from 1 hour to 3 hours.

11. Process according to claim 1, wherein the calcium-charged resin is separated by filtering from the concentrated soda solution.

12. Process according to claim 1, wherein the calcium-charged resin is regenerated by contact with a diluted hydrochloric acid solution at pH<3.

13. Process according to claim 12, wherein the hydrochloric acid is an impure HCl solution containing metallic salts.

14. Process according to claim 1, wherein the $RH^+$ cation resin is regenerated and separated by filtering from a neutralized eluted solution with a calcium chloride base.

15. Process according to claim 14, wherein the neutralized eluted solution with the calcium chloride base is put into contact with a diluted sulfuric acid solution to precipitate the calcium in the form of insoluble calcium sulfate which, after filtration, is discharged, while the filtrate containing the hydrochloric acid, the reaction product, is reused partially or completely for regeneration of the $RH^+$ resin.

16. Process according to claim 1, wherein the alkaline alkaline waste is a sodium effluent containing about 30 g $Na_2O$/liter and at least one impurity selected from the group consisting of sodium humates, carbonate, sulfate, and oxalate.

17. The process of claim 1, wherein said alkaline waste comprises red mud from the manufacture of aluminum hydroxide.

18. The process of claim 1, wherein said alkaline waste comprises sodium effluents from the manufacture of aluminum hydroxide.

19. The process according to claim 1, wherein the alkaline waste comprises (a) red mud from the manufacture of aluminum hydroxide, (b) sodium containing effluent resulting from the manufacture of aluminum hydroxide by a Bayer process, or both (a) and (b).

20. The process according to claim 1, wherein the alkaline waste comprises red mud from the manufacture of aluminum hydroxide.

21. The process according to claim 1, wherein the amount of sodium in said concentrated soda solution is at least 10% of that present in the alkaline waste.

22. The process according to claim 1, wherein the amount of sodium in said concentrated soda solution is at least 90% of that present in the alkaline waste.

23. In a Bayer process for producing aluminum, including digesting bauxite ore with a digestion liquor containing concentrated sodium hydroxide solution to produce a supersaturated sodium aluminate suspension and red mud, and complexing sodium in the red mud with an $RH^+$ type cation exchange resin, the improvement comprising removing the complexed sodium from the resin with lime to produce a concentrated soda solution and recycling the concentrated soda solution into the digestion liquor used to digest the bauxite ore.

\* \* \* \* \*

UNITED STATES PATENT AND TRADEMARK OFFICE
CERTIFICATE OF CORRECTION

| | |
|---|---|
| PATENT NO. : 6,110,377 | Page 1 of 1 |
| DATED : August 29, 2000 | |
| INVENTOR(S) : Jean-Michel-Lamerant | |

It is certified that error appears in the above-identified patent and that said Letters Patent is hereby corrected as shown below:

<u>Column 7</u>:
Line 40, Claim 3 "600°C" should read --60°C--.

Signed and Sealed this

Twelfth Day of June, 2001

*Attest:*

*Attesting Officer*

NICHOLAS P. GODICI
*Acting Director of the United States Patent and Trademark Office*